Sept. 20, 1938.   W. B. COLLINS ET AL   2,130,614
VALVE
Filed Nov. 8, 1935   2 Sheets-Sheet 1
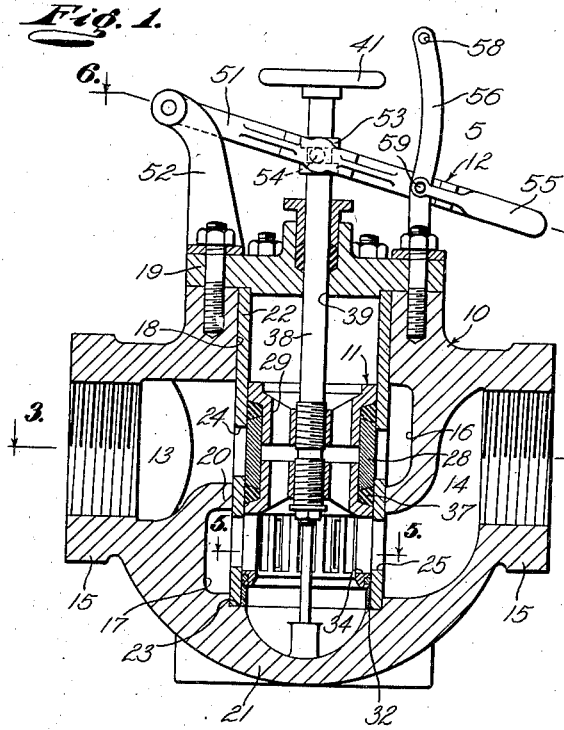
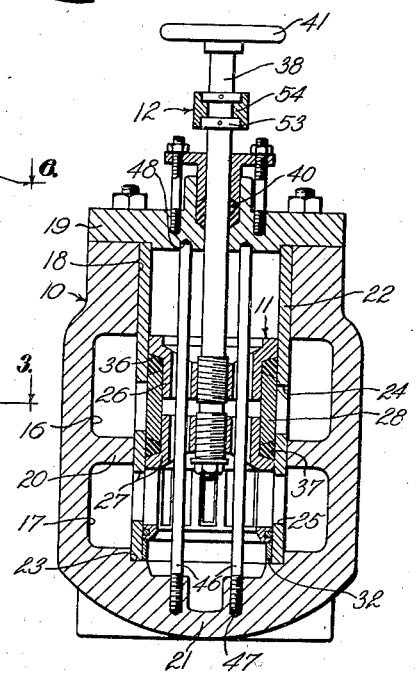
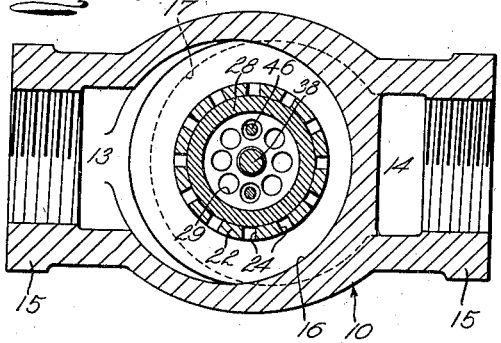
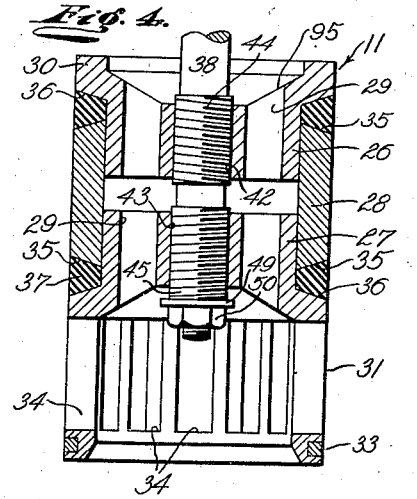
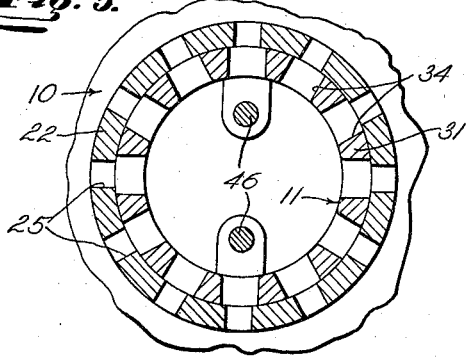
Inventors
WILLIAM B. COLLINS
and
WALTER W. BOGGS
By
Their Attorney

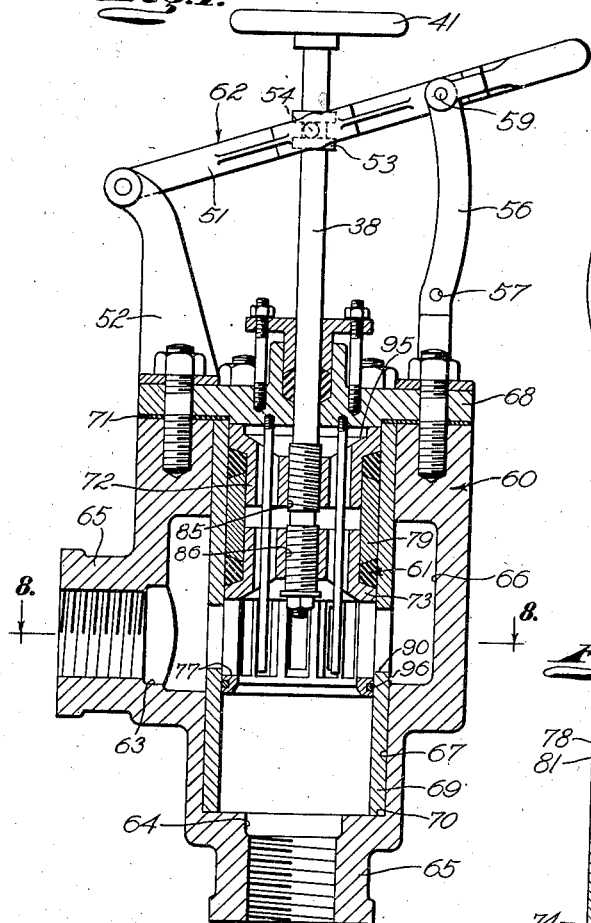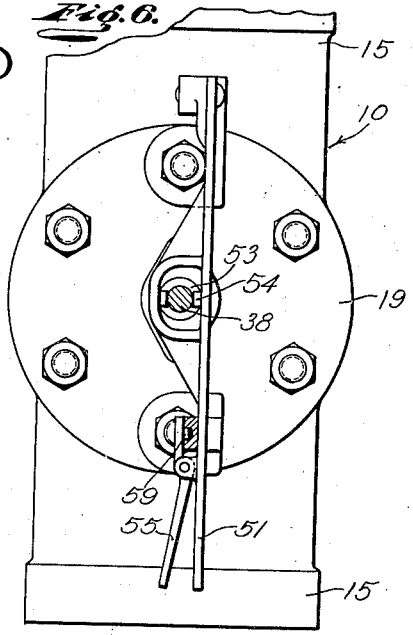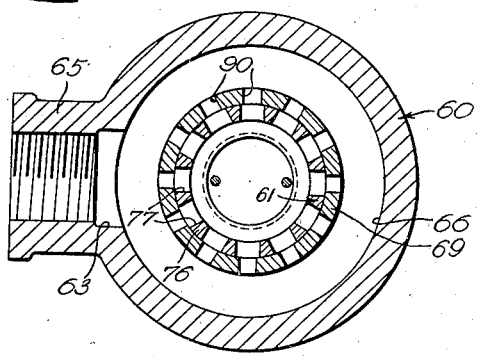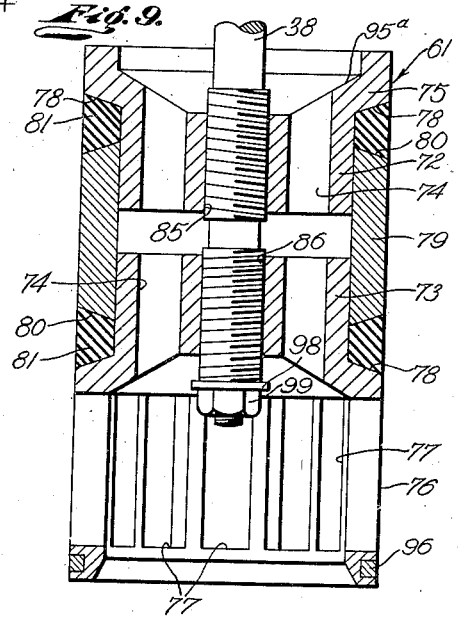

Patented Sept. 20, 1938

2,130,614

UNITED STATES PATENT OFFICE 2,130,614

VALVE

William B. Collins and Walter W. Boggs, Los Angeles, Calif.

Application November 8, 1935, Serial No. 48,832

11 Claims. (Cl. 251—27)

This invention relates to a valve and it is a general object of the invention to provide a simple, practical and particularly effective valve.

Another object of this invention is to provide a valve that is dependable and effective in handling fluids at high pressures and that is easy to open and close regardless of the pressure and flow conditions.

Another object of this invention is to provide a valve embodying a novel and very efficient sealing element or valve proper capable of preventing the passage and leakage of fluid under high pressures through the valve.

Another object of this invention is to provide an improved valve that does not become jammed or frozen when under high pressures or when it has remained closed or open for a long period. The sealing element or valve proper embodied in the valve of the present invention is movable through a finished cylinder and embodies packing that may be released or freed before shifting the valve between the closed and open positions so that the closure element or valve proper may be operated with a minimum of effort and does not become frozen in the manner of valves embodying tapered plugs, etc.

Another object of this invention is to provide a valve embodying a piston type valve element on which the radial pressures as well as the longitudinal pressures are balanced whereby it is floating or is substantially in a state of equilibrium.

Another object of this invention is to provide an improved valve of the character mentioned that may be easily and quickly repaired or reconditioned while connected in the line or conduit.

Another object of this invention is to provide a valve of the character mentioned that embodies a replaceable cylinder lining the opening of the body for shiftably carrying the piston type valve. The liner or cylinder of the valve provided by this invention may be easily replaced when worn or cut out by the fluid under pressure and, if necessary, the piston valve may also be replaced, the replacement of the cylinder and piston valve fully reconditioning the valve for further service. This distinguishes the valve of the invention over the valves heretofore introduced wherein the valve elements seat directly in the bodies and when the bodies become grooved or cut out by the action of the fluid it is necessary to replace the entire valve or at least discard the worn valve body.

Another object of this invention is to provide a valve of the character mentioned in which the valve element or piston valve covers the surface of the cylinder adjacent the ports when in the open as well as the closed position to prevent corroding and erosion of the cylinder surface.

Another object of this invention is to provide a valve that is long wearing and capable of continuous use over a long period as it embodies packing parts that are freed or released to retract before shifting of the valve proper so that they are not worn or scored by movement or shifting of the valve proper.

Another object of this invention is to provide a valve in which the closure element or sealing element is in the nature of a piston type valve that is substantially balanced by the fluid pressures present in the body of the valve.

A further object of this invention is to provide a valve of the character mentioned that is simple and inexpensive of manufacture and that is capable of embodiment in forms or types suitable for various installations and for the handling of different classes of fluids.

The various objects and features of our invention will be fully understood from the following detailed description of typical preferred forms and applications of our invention, throughout which description reference is made to the accompanying drawings, in which:

Fig. 1 is a central longitudinal detailed sectional view of one form of valve provided by this invention. Fig. 2 is a transverse detailed sectional view of the valve illustrated in Fig. 1, Figs. 1 and 2 illustrating the closure element or valve proper in its closed position. Fig. 3 is a transverse detailed sectional view taken substantially as indicated by line 3—3 on Fig. 1. Fig. 4 is an enlarged longitudinal detailed sectional view of the closure element or valve proper embodied in the valve illustrated in the Figs. 1 and 2 showing it removed from the body of the valve. Fig. 5 is an enlarged fragmentary transverse detailed sectional view taken substantially as indicated by line 5—5 on Fig. 1. Fig. 6 is a transverse detailed sectional view taken substantially as indicated by line 6—6 on Fig. 1. Fig. 7 is a longitudinal detailed sectional view of another form of valve provided by this invention. Fig. 8 is a transverse or horizontal detailed sectional view taken as indicated by line 8—8 on Fig. 7 and Fig. 9 is an enlarged longitudinal detailed sectional view of the closure element or valve proper removed from the body.

The embodiment of the present invention illustrated in Figs. 1 to 6, inclusive, of the drawings, includes generally a body 10 adapted to be connected in a pipe line, conduit or the like, a closure element or piston type valve 11 shiftable in the body 10 between open and closed positions and operable to seal with the interior of the body and means 12 for shifting the valve 11 between its open and closed positions and for actuating or expanding the valve to seal with the interior of the body 10.

The body 10 may be varied somewhat in its general shape and construction to adapt it for installation in various situations. In the typical form of the invention disclosed in the drawings the body 10 is adapted to be interposed in a conduit or line to connect two axially aligned portions or sections of the line. The body 10 may resemble, generally, the body of a globe valve having rounded or convex sides and a similarly shaped bottom. In accordance with the invention an inlet 13 enters one side of the body 10 and an outlet 14 extends to the opposite side of the body. Suitable bosses 15 may be provided around the inlet 13 and the outlet 14 to facilitate connection of the body 10 with portions of a pipe line or the like. In the illustrative embodiment of the invention disclosed in the drawings the bosses 15 are internally screw-threaded to facilitate their connection in the pipe line, it being understood that other suitable means may be provided for this purpose.

In accordance with the invention a cavity or groove 16 is provided in the interior of the body 10 to communicate with the inner end of the inlet 13 and a similar cavity or groove 17 is provided in the body 10 to communicate with the inner end of the outlet 14. The cavities or grooves 16 and 17 have a substantial fluid capacity and may have cylindrical curved side walls and substantially flat horizontal or normal upper and lower walls. The two grooves 16 and 17 are preferably out of alignment having the centers of curvature of their side walls spaced laterally one from the other for the purpose to be hereinafter described. In the preferred arrangement of parts illustrated in the drawings the groove 16 is spaced above the groove 17. Where the inlet 13 and the outlet 14 are axially aligned the outlet 14 may curve downwardly or laterally to join the groove 17 while the inlet 13 may have direct communication wtih the groove 16.

The body 10 is provided with an opening 18 for receiving or holding the valve 11. The opening 18 enters one end of the body 10, for example, it may enter the upper end of the body and its longitudinal axis is preferably normal to or at right angles to the axes of the aligned inlet 13 and outlet 14. The opening 18 is preferably cylindrical and its upper end is closed by a suitable bonnet or cap 19. The opening 18 passes downwardly or inwardly through the body 10 to intersect the grooves 16 and 17 and extends through the body partition 20 separating the grooves 16 and 17. The lower end of the opening 18 is closed by the integral lower wall 21 of the body 10. Where the grooves 16 and 17 are out of axial alignment the longitudinal axis of the opening 18 is preferably substantially equally spaced between the centers of curvature of the walls of the grooves. This relationship is clearly illustrated in Fig. 3 of the drawings.

In the preferred construction the opening 18 is lined with a liner or cylinder 22. The cylinder 22 is in the form of a simple tube of uniform diameter and its interior is finished to slidably or shiftably carry the valve 11. The liner or cylinder 22 is tightly force-fitted or otherwise fixed in the opening 18 to have fluid tight and pressure tight engagement with the internal walls of the body 10. The cylinder 22 is preferably secured in the opening 18 in a manner that permits its removal for replacement when it becomes worn. The upper end of the cylinder 22 is engaged by the under side of the cap 19 while the lower end of the cylinder 22 bears on a shoulder 23 on the bottom wall 21. The cylinder 22 arranged or positioned as just described passes through or intersects the internal body grooves 16 and 17. A series of circumferentially spaced ports 24 is provided in the wall of the cylinder 22 to communicate with the groove 16 and a similar series of ports 25 is provided in the wall of the cylinder 22 to communicate with the groove 17. Due to the offset arrangement of the grooves 16 and 17, described above, the cylinder 22 is located closer to the rear wall portion of the groove 16 than it is to the forward side of the groove and is located closer to the inner or rear wall portion of the groove 17 than it is to the outer portion or discharge portion of the groove. This relation of the cylinder 22 to the grooves 16 and 17 provides for a more equal distribution of the fluid to the ports 24 and 25 and for a greater freedom in the flow of fluid through the valve.

The closure element or valve 11 is in the nature of a piston valve shiftable longitudinally through the cylinder 22 between a position where it closes off the ports 24 and a position where the ports 24 are fully uncovered or open to connect the interior of the cylinder 22 with the body groove 16. It is a feature of the invention that the valve 11 is provided with packing that may be expanded or actuated to seal with the interior of the cylinder 22 and that may be freed or released when the valve 11 is to be shifted. To provide for the actuation or expansion of the said packing the valve 11 is sectional, comprising two hub parts or nut parts 26 and 27 related for relative longitudinal movement and a closure section or part 28 carried by the nut parts 26 and 27 and operable to close the ports 24.

The nut parts 26 and 27 of the valve 11 are cylindrical in their general configuration and are spaced apart axially or longitudinally within the cylinder 22. Aligned longitudinal ports 29 are provided in the nut parts 26 and 27 to maintain the upper and lower end portions of the cylinder 22 in communication whereby the valve 11 is under substantially balanced fluid pressures. A depression or tapered recess 95 is provided in the upper end of the nut part 26 to permit solid matter to freely drain through the ports 29 and to prevent solid matter from caking on the upper end of the valve. A skirt 30 is provided on the upper or outer end of the nut part 26 and is adapted to have sliding engagement with the interior of the cylinder 22 to assist in guiding the valve 11. The upper end of the skirt 30 may engage the under side of the cap 19 to limit the upper or outward movement of the valve 11. A skirt 31 of substantial length is provided on the inner or lower end of the nut part 27 and has extensive sliding engagement with the interior of the cylinder 22 to effectively guide the valve 11 in the cylinder. The lower end of the skirt 31 may cooperate with a stop 32 on the shoulder 23 to limit the inward movement of the valve 11. The stop 32 may be in the form of a ring as shown. If desired or believed necessary a scraping ring 33 may be provided on the lower portion of the skirt 31 to clean the wall of the cylinder 22. The skirt 31 covers and protects the surface of the cylinder 22 adjacent the ports 24 to prevent cutting out or scoring of the surface and thus insures the proper sealing of the valve with the surface. Slots or ports 34 are provided in the wall of the skirt 31 to register with the ports 24 when the valve 11 is in its open position and to register with the ports 25 when the valve is in its closed position. The ports 34 are preferably wider and of greater fluid capacity than the ports 24 and 25, as illustrated in Fig. 5 of the drawings.

The closure section or part 28 of the valve 11 may be a simple cylindrical tubular member arranged on the cylindrical peripheral surfaces of the nut parts 26 and 27. The closure part 28 is proportioned to extend completely across the ports 24 and to have engagement with the walls of the cylinder 22 above and below the ports 24 when the valve is in its closed position. The opposite ends 35 of the closure part 28 form axially facing annular shoulders. The inner sides or ends of the skirts 30 and 31 form annular shoulders 36 which are spaced from and which oppose the shoulders 35.

The expansible packing means of the valve 11 for sealing with the interior of the cylinder 22 comprises annular bodies or rings 37 of packing on the valve 11. The packing rings 37 are arranged on the nut parts 26 and 27 between the sets or pairs of opposing shoulders 35 and 36. It may be preferred to make the ends of the packing rings 37 and the shoulders 35 and 36 inwardly convergent as shown to have a wedging as well as compressing action. The invention contemplates the formation of the packing rings 37 of various types of packing material to adapt the valve to handle fluids of various classes. In practice the rings 37 may be formed of rubber, rubber composition, metallic packing material, semi-metallic packing material, metal, Duphane, or the like. Upon movement of the nut parts 26 and 27 toward one another by the means 38 as will be subsequently described, the packing rings 37 are compressed and are thus actuated or expanded into sealing cooperation with the internal wall of the cylinder 22. The closure part 28 of the valve 11 forms an abutment for the packing rings 37 and constitutes a spacer or equalizer to insure the equal actuation of the two rings 37. The part 28 bears on the parts 26 and 27 and directly receives the pressure imposed by the fluids handled relieving the packing rings of these forces.

The means 12 for shifting and actuating the valve 11 is a simple manual means readily operated by a single operator. The valve shifting and operating means 12 includes a stem 38 passing through a central opening 39 in the cap 19 and sealed about by a suitable packing gland 40 on the cap. A suitable hand wheel 41 is provided on the outer end of the stem 38 for facilitating rotation and longitudinal shifting of the stem. The stem 38 is rotatable by means of the wheel 41, and operative connections are provided between the stem 38 and the nut parts 26 and 27 for effecting relative longitudinal movement between the nut parts 26 and 27 when the stem 38 is rotated. The stem 38 extends through a central longitudinal opening 42 in the nut part 26 and extends through a central longitudinal opening 43 in the nut part 27. The operative connections between the stem 38 and the nut parts 26 and 27 comprise threads 44 on the stem 38 and the wall of the opening 42 and threads 45 on the stem 38 and the wall of the opening 43. The threads 44 and 45 are pitched in opposite directions, that is, the threads 44 are left-hand threads and the threads 45 are right-hand threads or vice versa. It is to be understood that the invention contemplates the provisions of an operative threaded connection between the stem 38 and only one of the nut parts 26 or 27, in which case the remaining nut part 26 or 27 has shouldered engagement with the stem 38 whereby rotation of the stem 38 effects movement of the nut parts toward one another or away from one another, depending upon the direction of rotation of the stem.

Means is provided for holding the nut parts 26 and 27 against rotation. Rods 46 pass through certain of the longitudinal ports 29 in the nut parts and are engageable by the walls of the openings. The rods 46 may be secured in position in any suitable manner. In the particular case illustrated the lower ends of the rods 26 are threaded into sockets 47 in the lower body wall 21 and sockets 48 in the cap 19 receive the upper end portions of the rods. It is believed that it will be apparent that upon rotation of the stem 38 in one direction the cooperation of the threads 44 and 45 causes movement of the nut parts 26 and 27 toward one another and that rotation of the stem 38 in the opposite direction results in movement of the nut parts 26 and 27 away from one another. If desired or found necessary a washer 49 may be provided on the lower end portion of the stem 38 to limit the downward threading of the nut part 27. A nut 50 may be provided on the stem 38 to hold the washer 49 in place.

The valve shifting and operating means 12 includes a simple convenient means for shifting the stem 38 and the valve 11 longitudinally and for positioning the stem 38 where the valve 11 is in its fully open position and is in its fully closed position. The valve and stem shifting means comprises a lever 51. The lever 51 may have one end pivotally mounted on a post or support 52 on the cap 19. Spaced collars 53 are pinned or otherwise fixed to the stem 38 and the lever 51 has projections or pins 54 extending between and cooperating with the collars 53 whereby pivoting of the lever effects longitudinal shifting of the stem 38. The outer end portion of the lever 51 is in the nature of a handle portion and a latch 55 is pivoted to the lever 51 to be readily engaged and depressed when the handle portion is grasped. A relatively fixed member 56 projects upwardly from the cap 19 or the body 10 and is provided with vertically spaced openings 57 and 58. The latch 55 is provided with a pin 59 adapted to enter the openings 57 and 58. The opening 57 is located so that cooperation of the pin 59 with it definitely positions the stem 38 where the valve 11 closes the ports 24. Cooperation of the latch pin 59 with the opening 58 definitely positions the stem 38 in a position where the valve 11 is fully open having its ports 34 in complete communication with the ports 24. The cooperation of the pin 59 with the opening 57 or the opening 58 effectively prevents shifting of the valve 11 by fluid pressure. However, as the valve 11 is substantially balanced there is little or no tendency for the pressures in the body 10 to shift the valve.

It is believed that the operation of the valve illustrated in Figs. 1 to 6 of the drawings will be readily understood from the foregoing detailed description. Assuming that the lever 51 is in the position where the latch pin 59 cooperates with the opening 58, the valve 11 is in the position where its ports 34 are in full communication with the ports 24. This is of course the open position of the valve 11 and there is free passage of fluid through the valve. When the valve 11 is in its open position the nut parts 26 and 27 may be positioned with respect to one another to have the packing rings 37 substantially free of compression or the packing rings 37 may be maintained under suitable compression when the valve is open. To shift the valve 11 from its open to its closed position the handle portion of the lever 51 is grasped and the latch 55 is depressed, disengaging the pin 59 from the opening 58. The lever 51 is then swung downwardly to move the valve 11 downwardly through the cylinder 22. When the lever 51 has been moved downwardly to the position where the latch pin 59 enters the opening 57 the lever and the latch 55 may be disengaged by the operator as the cooperation of the pin with the opening 57 properly positions the valve 11 in its closed position. It is to be understood that the nut parts 26 and 27 of the valve 11 are preferably related so that the packing rings 37 are under little or no compression when the valve is shifted through the cylinder.

When the valve 11 has thus been set in its closed position the stem 38 may be rotated by the means of the hand wheel 41 so that cooperation of the threads 44 and 45 results in movement of the nut parts 26 and 27 toward one another. This movement of the nut parts 26 and 27 compresses the packing rings 37 against the shoulders 35. In this manner the packing rings 37 are compressed so that they are forced outwardly or expanded to have tight, effective sealing cooperation with the internal wall of the cylinder 22, the shoulders 35 and 36 and the parts 26 and 27. The stem 38 may be rotated until it is believed that the packing rings 37 have been actuated or expanded the desired extent to properly and dependably prevent the leakage of fluid past them. The packing rings 37 have sealing cooperation with the internal wall of the cylinder 22 above and below the ports 24 when the valve is in its closed position and this engagement effectively prevents the passage and leakage of fluid under pressure past the valve 11. The closure part 28 of the valve 11 which may be formed of hard, abrasion and wear resisting material directly faces and completely extends across the several ports 24 and constitutes an equalizing abutment between the two compressed packing rings 37. Thus the valve 11 provides a tight dependable closure or seal for sealing off the flow through the valve. As the ports 24 are arranged in an annular or circumferential series the pressures exerted by the fluid on the valve are substantially equalized or uniform throughout the circumference of the valve. In the event there is pressure on the fluid in the downstream side of the valve the pressures in the opposite end portions of the cylinder 22 substantially balance one another in their action on the valve 11. The radial pressures on the valve 11 are also balanced so that the valve floats or is substantially fully balanced. The ports 29 maintain the opposite end portions of the cylinder opening in communication.

When it is desired to shift the valve 11 from its closed position to the open position it is preferred to first rotate the stem 38 by means of the hand wheel 41 to shift the nut parts 26 and 27 apart or away from one another. This shifting of the nut parts relieves the compression strain on the packing rings 37 allowing the packing rings to return to their normal shape and size freeing them or substantially freeing them from the internal wall of the cylinder 22. Following the releasing or freeing of the packing rings 37 the latch 55 may be depressed to release its pin 59 from the opening 57 and the lever 51 is swung upwardly. This movement of the lever of course moves the valve 11 upwardly through the cylinder 22 and the valve may be brought to and retained in its fully opened position by entering the latch pin 59 in the opening 58. It is to be noted that cutting out and wearing of the cylinder 22 at the ports 24 and 34 and wearing and eroding of the skirt 31 does not impair the operation of the valve. When the cylinder 22 and the valve 11 become excessively worn they may be readily replaced without removing the body 10 from the pipe line or conduit.

The form of the invention illustrated in Figs. 7 to 9 inclusive of the drawings includes, generally, a body 60 adapted to be connected in a pipe line or the like, a shiftable and expansible valve 61 in the body 60 operable to cut off the flow of fluid therethrough, and means 62 for shifting and expanding the valve 61.

The body 60 of the valve shown in Figs. 7 to 9 of the drawings is adapted to be interposed in a pipe line or fluid handling system to conduct the fluid passing therethrough and is shaped to change the direction of flow, that is, the body 60 is in the form of an L or elbow for changing the direction of flow substantially 90°. It is obvious, of course, that fittings of various characters may be connected with the body 60 or provided in the pipe line to provide for the flow of fluid as desired. An inlet 63 enters one side of the body 60 and a fluid outlet 64 extends to one end of the body. Bosses 65 are provided at the inlet 63 and the outlet 64 to facilitate the connection of the body 60 in the pipe line. The bosses 65 may be internally threaded or otherwise conditioned for ready connection with elements of the conduit or pipe line. An inlet cavity or opening 66 is provided in the valve body 60 at the inner end of the inlet 63. The opening 66 may have a cylindrical side wall and flat normal upper and lower walls. In practice the opening 66 may be substantially concentric with the outlet 64. The cavity or opening 66 is preferably comparatively large or of substantial fluid capacity to readily handle the fluid admitted by the inlet so that there is no restriction in its flow.

The body 60 is provided with an opening 67 which connects with or intersects the opening 66. The opening 67 is considerably smaller in diameter than the opening 66 and may be concentric with that opening. The opening 67 enters what may be termed the upper end of the body 60 and the lower end of the opening 67 joins or communicates with the outlet 64. A cap 68 is provided on the upper end of the body 60 to close the upper end of its opening 67. The opening 67 is preferably cylindrical and of uniform diameter. The opening 67 is provided to carry the valve 61 and is preferably provided with a liner or cylinder 69 for slidably carrying the valve. The cylinder 69 is a simple, tubular member whose internal surface is finished for sliding engagement by the valve 61. The lower end of the cylinder 69 may bear on the lower end wall 70 of the body opening 67. The upper end of the cylinder 69 may be engaged by the cap 68 or a gasket 71 provided at the lower end of the cap. A series of circumferentially spaced openings 90 is provided in the wall of the cylinder 69 to communicate with the lower or inner portion of the opening 66. The cylinder 69 is tightly force-fitted or otherwise fixed in the body opening 67 to have fluid tight and pressure tight cooperation with its wall. The cylinder 69 is secured in the opening 67 so that it may be replaced when worn or cut out.

The valve 61 is in the nature of a piston valve operable longitudinally in the cylinder 69 between a position where it completely closes and seals off the ports 90 and a position where the ports 90 are fully uncovered. In practice the valve 61 may be similar to or identical with the valve 11 of the previously described form of the invention. The valve 61 includes two like opposed nut parts 72 and 73 having spaced aligned longitudinal ports 74. A skirt 75 is provided on the upper end of the upper part 72 to assist in guiding the valve through the cylinder 69. The part 72 has a tapering recess 95ᵃ in its upper end for preventing accumulations of solid matter from affecting the operation of the valve. A skirt 76 of substantial length is provided on the lower end of the nut part 73 to guide the valve 61 through the cylinder 69 and to protect the wall of the cylinder against corrosion, and the abrading action of the fluid handled. A circumferential series of spaced ports 77 is provided in the skirt 76 and the ports 77 are adapted to communicate with the ports 90 when the valve 61 is in its open position. The lower end of the skirt 76 may engage the shoulder 70 to limit the downward movement of the valve 61 through the cylinder. A scraping ring 96 may be provided on the skirt 76 for cleaning the surface of the cylinder 69. The skirt 76 covers and protects the surface of the cylinder 69 adjacent the ports 90 when the valve 61 is in its open position. The inner ends of the skirts 75 and 76 form annular shoulders 78 on the nut parts 72 and 73.

The valve 61 includes a sealing part or closure part 79 surrounding and shiftably engaging the nut parts 72 and 73. The closure part 79 is proportioned to extend completely across the ports 90 and project beyond the upper and lower ends of the ports 90 when the valve 61 is in its closed position. The opposite ends of the closure part 79 form axially facing shoulders 80 which are spaced from and oppose the shoulders 78. Compressible and expansible packing rings 81 are arranged on the nut parts 72 and 73 between the shoulders 78 and 80. The rings 81 may be formed of rubber, rubber composition, metallic packing material, metal, Duphane, or any other form of sealing or packing material depending upon the character of the fluid to be handled by the valve. The ends of the packing rings 81 are preferably inwardly convergent and the shoulders 78 and 80 are preferably correspondingly convergent whereby they have a wedging as well as a compressing action in their engagement with the packing rings. The nut parts 72 and 73 of the valve 61 are shiftable toward one another by the means 62 and this relative movement provides for the compression of the packing rings 81 causing the packing rings to be forced and expanded outwardly into tight sealing cooperation with the internal surface of the cylinder 69. A stop washer 98 may be secured to the inner end part of the stem 38 by a nut 99. Rods 88 depend from the cap 68 and extend through certain of the ports 74 to prevent rotation of the parts 72 and 73.

The means 62 of the valve illustrated in Figs. 7 to 9 of the drawings for shifting the valve 61 between its open and closed positions and for actuating or compressing the packing rings 81 of the valve 61 may be identical with the valve shifting and actuating means 12 of the previously described form of the invention and the corresponding reference numerals will be employed in connection with its several parts. The stem 38 of the operating means 62 passes through and has threaded engagement with at least one of the nut parts 72 and 73. In the case illustrated in the drawings the stem 38 is threaded through openings 85 and 86 respectively, in the nut parts 72 and 73 and has oppositely pitched threads cooperating with the nut parts whereby turning of the stem in one direction shifts the parts 72 and 73 toward one another and turning of the stem in the other direction shifts the parts away from one another. The stem 38 carrying the valve 61 is adapted to be shifted axially by pivoting of the lever 51 and the lever may be positioned by means of the latch pin 59 to set the valve 61 in the fully open position and the fully closed position.

The operation of the valve illustrated in Figs. 7 to 9 inclusive of the drawings is substantially identical with the operation of the valve illustrated in Figs. 1 to 6 inclusive of the drawings. Assuming that the valve 61 is in the position illustrated in Fig. 7 of the drawings and it is desired to close the valve, the operator engages the lever 51 and depresses the latch 55 to release the pin 59 from the opening 58 and then pivots the lever 51 downwardly. This shifts the valve 61 to its closed position which may be accurately determined by entering the latch pin 59 in the opening 57. The nut parts 72 and 73 of the valve 61 are preferably related so that the packing rings 81 are free or relatively unconstrained when the valve is to be shifted. With the valve 61 in its fully closed position the operator may turn the stem 38 by means of the hand wheel 41 to cause the nut parts 72 and 73 to move toward one another. This movement of the nut parts 72 and 73 results in compression and outward forcing or expansion of the packing rings 81. Thus the packing rings 81 are forced into tight sealing cooperation with the internal surface of the cylinder 69. The packing rings 81 are adapted to seal with the wall of the cylinder 69 in planes above and below the ports 90 whereby the valve 61 is operable to completely and dependably seal off the ports and thus prevent flow and leakage through the valve.

When the valve 61 is to be returned to its opened position the stem 38 is rotated to shift the nut parts 72 and 73 in opposite directions. This removes the compression strain from the packing rings 81 and the lever 51 is swung upwardly to move the valve 61 to its open position. As the packing rings 81 are relieved of compression when the valve 61 is shifted they permit the free easy shifting of the valve and are not excessively worn or scored by the movement of the valve through the cylinder 69. With the valve 61 in its opened position the ports 77 are in full communication with the ports 90 to permit free flow through the valve. The valve 61 is substantially balanced and as its packing rings 81 may be freed of compression it may be easily shifted between its open and closed position regardless of the pressure on the fluid handled by the valve.

The invention contemplates the provision of cleaning or scraping rings on the outer or upper skirts 30 and 75, such rings operating in substantially the same manner as the rings 33 and 96. It is to be particularly noted that the intermediate members 28 and 79 of the valves have equal end pressures exerted on them and that the members 28 and 79 act as equalizers between the spaced packing rings and that by reason of the circumferentially spaced ports 24 and 90 the radial fluid pressures acting on the members 28 and 79 are substantially fully balanced. Thus the members 28 and 79 of the valves are fully "floating" or fully balanced so that they are not urged against walls of the cylinders or the nut parts of the valves causing wearing or binding of the parts. The circumferentially spaced ports 25—34 and 77—90 provide for the radial in-flow of the fluid into the valves and cylinders at circumferentially spaced points which in-flow is in streams or currents which converge at common zones so that the action of the fluid neutralizes itself. Thus the circumferentially spaced inwardly flowing streams admitted by the spaced ports of the cylinders and valves insure the passage of the fluid through the valves without the eroding or cutting out of the parts by the action of the fluid or solid matter in the fluid. The upper or outer ends of the nut parts 26 and 72 of the valves in being dished or provided with recesses prevent the excessive accumulation of solid matter at these points and any accumulations of solid matter that may be present do not interfere with the proper action of the valves. The various features of the valves mentioned above taken with the features flowing from the structures specifically described above provide for the effective, dependable and efficient operation of the valves provided by the invention.

Having described only typical preferred forms and applications of our invention, we do not wish to be limited or restricted to the specific details herein set forth, but wish to reserve to ourselves any variations or modifications that may appear to those skilled in the art or fall within the scope of the following claims:

Having described our invention, we claim:

1. A valve comprising a body having an inlet, an outlet and an opening, a valve movable in the opening comprising a closure member adapted to extend across the inner end of the inlet, packing at the opposite ends of the member for sealing with the wall of the opening at opposite sides of the inlet, and parts movable to compress the packing against the said wall, and a stem rotatable to move said parts to actuate the packing and axially shiftable to move the valve between the open and closed positions.

2. A valve comprising a body having an inlet and an outlet for communicating with a conduit, and having an opening substantially transverse of the inlet and outlet and cavities at the inner ends of the inlet and outlet intersected by the said opening, a cylinder lining said opening and having a series of circumferentially spaced ports communicating with the cavities, and a valve shiftable in the cylinder between a position where it seals the series of ports communicating with the inlet cavity and a position where the said series of ports are uncovered, the valve including a closure member for sealing off said series of ports communicating with the inlet cavity whereby the radial pressures on the valve are equalized, and a scraper ring for cleaning the internal wall of the cylinder during such movement of the valve.

3. A valve comprising a body having a fluid passage and a cylindrical opening intersecting the passage, a valve element shiftable in the opening comprising two relatively movable parts and packing associated with the parts to be actuated into sealing contact with the interior of the body by relative movement of the parts in one direction, and a single member for shifting the element between the open and closed positions and for effecting positive movement of the said parts relative to one another in both directions with the valve element in any position to actuate and free the packing.

4. A valve comprising a body having an inlet, an outlet and an opening, a valve movable in the body comprising a member adapted to cover the inlet, relatively movable parts carrying the member, packing arranged between the ends of the member and shoulders on the parts, and means for moving the parts toward and away from one another to effect actuation of the packing to seal with the body and to effect freedom of the packing to permit easy movement of the valve.

5. A valve comprising a body having an inlet, an outlet and an opening, a valve movable in the body comprising a member adapted to cover the inlet, relatively movable parts carrying the member, packing arranged between the ends of the member and shoulders on the parts, and means for moving the parts toward and away from one another to effect actuation of the packing to seal with the body and to effect freedom of the packing to permit easy movement of the valve, said means including a rotatable stem having threaded engagement with at least one of the said parts.

6. A valve comprising a body having an inlet, an outlet and an opening, a valve movable in the body comprising a member adapted to cover the inlet, relatively movable parts carrying the member, packing arranged between the ends of the member and shoulders on the parts, and means for moving the parts toward and away from one another to effect actuation of the packing to seal with the body and to effect freedom of the packing to permit easy movement of the valve, there being a port ni the valve communicating with the opposite ends of the body whereby the pressures in said opposite ends are equalized.

7. A valve comprising a body having an inlet, an outlet and an opening, a valve movable in the body comprising a member adapted to cover the inlet, relatively movable parts carrying the member, packing arranged between the ends of the member and shoulders on the parts, skirts on said parts cooperating with the body to guide the valve therein, and means for moving the parts toward and away from one another to effect actuation of the packing to seal with the body and to effect freedom of the packing to permit easy movement of the valve.

8. A valve comprising a body having an inlet, an outlet and an opening, a valve movable in the body comprising a member adapted to cover the inlet, relatively movable parts carrying the member, packing arranged between the ends of the member and shoulders on the parts, a rotatable stem having threaded engagement with at least one of said parts to move the parts relative to one another to actuate the packing, the stem being axially movable to move the valve between the open and closed positions, and means for releasably setting the stem in positions where the valve is open and closed.

9. A valve comprising a body having an inlet, and an outlet disposed at right angles to one another and an opening joining the inlet and outlet and substantially axially aligned with the outlet, a valve movable in the body and comprising packing for sealing with the body at opposite sides of the inlet, and relatively movable parts for actuating the packing, and a stem rotatable to move said parts relative to one another to actuate the packing and axially shiftable to move the valve between its open and closed positions.

10. A valve comprising a body having an inlet, and an outlet disposed at right angles to one another and an opening joining the inlet and outlet and substantially axially aligned with the outlet, a ported valve movable in the body and comprising packing for sealing with the body at opposite sides of the inlet, and relatively movable parts for actuating the packing, means for preventing rotation of said parts, and a stem for shifting the valve and having threaded cooperation with at least one of said parts whereby rotation of the stem moves the parts to actuate the packing.

11. A valve including a body having an inlet, an outlet and an opening, a valve shiftable in the body to control said inlet, the valve including two relatively shiftable parts, and packing operable by relative movement of said parts to seal with the internal wall of the body at opposite sides of the said inlet when the valve is in the closed position, and a single stem movable axially to shift the valve between the open and closed positions and rotatable to positively shift said parts relative to one another in both directions to actuate and free the packing.

WILLIAM B. COLLINS.
WALTER W. BOGGS.